United States Patent
Wallace

[15] 3,636,780
[45] Jan. 25, 1972

[54] ACTUATABLE DRIVESCREW DEVICE

[72] Inventor: Harry L. Wallace, Garden City, Mich.
[73] Assignee: Burroughs Corporation, Detroit, Mich.
[22] Filed: Mar. 9, 1970
[21] Appl. No.: 17,386

[52] U.S. Cl. ..................74/89.15, 74/424.8 NA, 74/459, 74/DIG. 4
[51] Int. Cl. ...............................................F16h 27/02
[58] Field of Search ...........74/89.15, 459, DIG. 4, 424.8 NA

[56] References Cited

UNITED STATES PATENTS

| | | |
|---|---|---|
| 2,478,510 | 8/1949 | Stolpe.........................................74/459 |
| 2,824,460 | 2/1958 | Davis..................................74/DIG. 4 |
| 3,258,983 | 7/1966 | Valenti....................................74/459 |

*Primary Examiner*—William F. O'Dea
*Assistant Examiner*—Wesley S. Ratliff, Jr.
*Attorney*—Kenneth L. Miller and Edwin W. Uren

[57] ABSTRACT

A drivescrew is provided with a sleeve-type housing containing a plurality of balls engageably associated with that portion of the helical threads of the screw translatably disposed therewithin, the balls being actuatably prevented or permitted to revolve with the threads of the screw to thereby translate or not translate, respectively, the sleeve-type housing along the screw as the latter is rotated.

5 Claims, 4 Drawing Figures

PATENTED JAN 25 1972  3,636,780

INVENTOR
HARRY L. WALLACE
BY
Edwin W Uren
AGENT 3,636,780

ACTUATABLE DRIVESCREW DEVICE

BACKGROUND OF THE INVENTION

The invention relates to mechanisms transposing rotary to linear, axial movement using associated external and internal screws.

Prior art discloses drivescrew devices using rotating external screws threaded through rotationally stationary internal screws. A typical example may be found in a print carrier drive mechanism, where a print head is mounted on a carrier to be driven longitudinally along a platen. Such carriers include an internally threaded member adapted to receive an externally threaded drivescrew which, when rotated, translates the carrier axially along the platen. The threads of both the externally threaded drivescrew and the internally threaded member are fixed and in constant engagement, carrier movement being initiated and halted by respectively rotating and stopping the externally threaded drivescrew.

Other typical print carrier drive mechanisms include similar internally and externally threaded drive members to translate carriers and also include limited-slip friction devices to couple drive to the externally threaded screws or to couple the internally threaded members to their respective carriers. In these latter mechanisms, drive is applied continuously; and carrier translation is controlled by mechanical stops.

The mechanism described in the first example is subject to fatigue and wear due to the inherent necessity for frequently starting and stopping the drivescrew, thus increasing the cost of construction and maintenance.

The limited-slip friction devices described in the second example provide drive which is a function of ambient environmental conditions such as temperature and humidity and is therefore inconstant. As the friction devices wear with use, the frictional coupling factor is altered, normally declining, eventually resulting in a maintenance problem. The heat generated by the friction surfaces also contributes to alternating the coupling factor and, in extreme cases, may even deleteriously affect adjacent components; and its dissipation presents a problem which must be considered, frequently adding to the cost of design and manufacturing. Since at least a minimal amount of drive is continuously applied to the carrier, relatively substantial stops are required, again adding to the cost of construction.

The threads of the mechanisms of both of the above-described examples are naturally subject to wear, which gives rise to yet another maintenance problem in the area of print location accuracy.

SUMMARY OF THE INVENTION

The invention resides in the provision of an actuatable drivescrew device to produce translation of an internally threaded member axially along an externally threaded screw.

Accordingly, it is an object of the present invention to provide an actuatable drivescrew device operable with continuously applied drive and wherein fatigue and wear resulting from component accelerations are minimized.

It is another object of the invention to provide a drive device which is positive and constant and not subject to variations due to changes in ambient environmental conditions.

It is yet another object of the invention to provide an actuatable drivescrew device which is positively coupled, thus eliminating the maintenance and operational problems inherent in friction drive devices.

Still another object of the invention is to provide a drive device which will generate no appreciable heat at the point of drive coupling and thus eliminate the usual wear, drive variation and heat-dissipation problems.

Another object of the invention is to provide a simple and reliable drive device which will require relatively light and inexpensive mechanical stops to halt axial translations.

Yet another object of the invention is to provide a drivescrew device which uses balls as the threads of one of the screw members, thereby substantially reducing drive thread wear.

An important aspect of the invention is the use of balls as a means of coupling the drive of a rotating screw to a translating member, the balls performing the function of the internal threads of the translating member which mesh with the threads of the rotating driving screw member.

Another important aspect of the invention is means for selectively permitting the balls to revolve with the rotating screw and to individually rotate in typical ball-bearing-effect fashion, or to hold them fixed with respect to the translating member so as to function as integral threads thereof and to thereby drive the translating member axially along the rotating screw.

BRIEF DESCRIPTION OF THE DRAWINGS

These and other objects, aspects and advantages of the invention will be more clearly understood from the following description when read in conjunction with the accompanying drawings, in which.

DETAILED DESCRIPTION OF THE INVENTION

Figure 1:
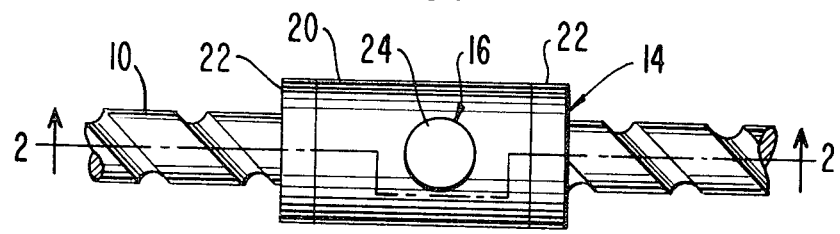
FIG. 1 is a plan view of an actuatable drivescrew device embodying features of the invention.

Referring to the drawings, the actuatable drivescrew device shown has a rotatable external screw 10, an internal screw 12, an internal screw housing 14 and an internal screw actuator 16. The internal screw 12 is disposed around the external screw 10 by the internal screw housing 14 in such a manner as to assume an engageable relationship with the threads of the external screw 10. The internal screw actuator 16 is effectively positioned proximate the internal screw 12.

The external screw 10 is effectively a shaft having threads helically circumscribing its periphery. The internal screw 12 includes a plurality of balls 18 mutually juxtaposed in a portion of the helical thread of the external screw 10, the balls 18 having freedom to individually rotate.

The internal screw housing 14 includes a circular sleeve 20 having an internal diameter slightly larger than the outside diameter of the external screw 10. The sleeve 20 is positioned around that length of the external screw 10 whereon the balls 18 are located, thereby maintaining their effective relationship with the external screw 10. Also included in the housing 14 are annular abutments 22 affixed to opposite ends of the sleeve 20 to receive the external screw 10 and to contain the balls 18 within the sleeve.

Figure 2:
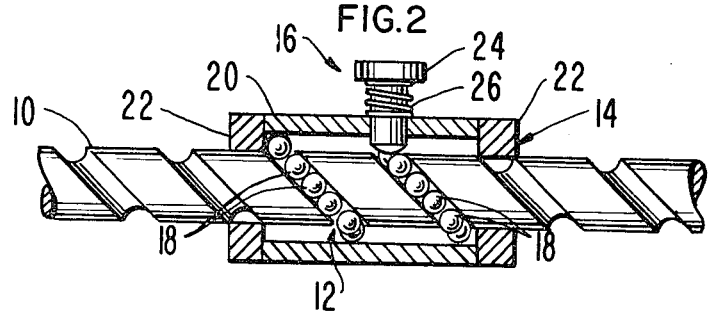
FIG. 2 is a side view, partly in section, taken in the direction of the arrows 2—2 of FIG. 1.

With reference to FIGS. 1 and 2, a first embodiment of the invention is shown wherein the internal screw actuator 16 is a stop 24 insertable through the sleeve 20 to intercept one of the balls 18 in its path of revolution within the sleeve 20. This stop is resiliently biased away from the balls 18 by a helical spring 26, which returns the stop to a rest position when actuation of the device is terminated. FIG. 2 shows the stop 24 in it actuated position.

Figure 3:
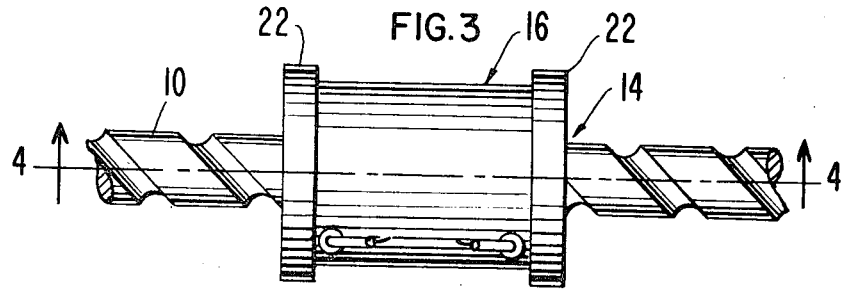
FIG. 3 is a plan view of another embodiment of the invention.
Figure 4:
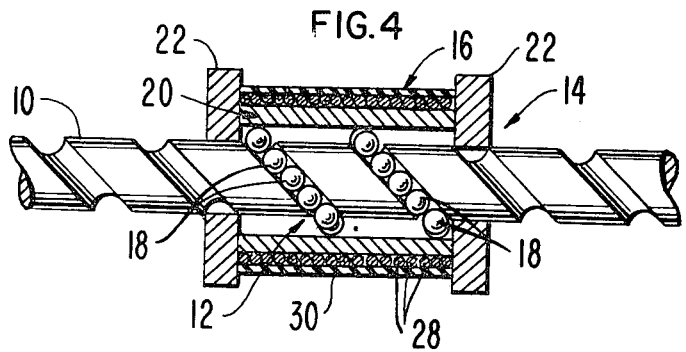
FIG. 4 is a side view, partly in section, taken in the direction of the arrows 4—4, of FIG. 3.

With reference to FIGS. 3 and 4, a second embodiment of the invention is shown wherein the internal screw actuator 16 is an electromagnetic coil 28 wound around the outer surface of the sleeve 20. In this embodiment, the external screw 10 is constructed of nonmagnetic material; and the balls 18 are ferromagnetic. The coil 28 is so wound that its magnetic field will effectively influence the balls 18 when it is energized. Covering the coil 28 is a shield 30 of nonconducting material, such shield providing protective insulation to the coil.

OPERATION OF THE INVENTION

With reference to FIGS. 1 and 2, the operation of the first embodiment may be illustrated. The external screw 10 may be rotated by any one of a number of common business machine motors (not shown) in, for example, a counterclockwise direction as viewed from the left end thereof. The stop 24 is normally held in its rest position away from the balls 18 by the spring 26. With the stop so positioned, rotation of the external screw 10 within the housing 14 will cause the balls 18 to revolve around the interior surface of the sleeve 20. Since the balls are free to individually rotate as they so revolve, a ball bearing effect is provided between the external screw 10 and the sleeve 20, thereby permitting the internal screw housing 14 to remain motionless despite the rotation of the external screw.

To actuate the device for translation of the housing 14, the stop 24 is urged to the position shown in FIG. 2 by any suitable apparatus (not shown) commonly used for such purposes. In this actuated position, the stop 24 is disposed in the path of revolution of the balls 18 and effectively intercepts one of the balls, thereby stopping the revolution of all of the balls both with respect to their individual rotation and their curvilinear revolution around the interior surface of the sleeve 20. Since the threads of the external screw 10 are inclined to the left, as this rotating screw attempts to force the balls 18 to revolve, a component of the force exerted is directed to the right to thereby drive the internal screw housing 14 in a corresponding direction.

When the housing 14, to which may be attached, for example, a print head carrier, has been translated the distance desired, the stop 24 is released and returned by the spring 26 to its rest position away from the balls 18. Since the balls are now free to revolve within the sleeve 20, the housing 14 is permitted to idle in a fixed position on the rotating external screw 10.

With reference to FIGS. 3 and 4, the operation of the second embodiment may be illustrated. The external screw 10 is rotated as in the first embodiment in, for example, a counterclockwise direction as viewed from the left end thereof. The balls 18 revolve around the interior surface of the sleeve 20 as previously described, again acting as a ball bearing between the external screw 10 and the sleeve 20, permitting the internal screw housing 14 to remain motionless while the external screw 10 rotates.

To actuate the device, the coil 28 is electrically energized, thus creating a magnetic field. Since the balls 18 are constructed of a ferromagnetic material, they are so affected by the field that their revolving motion is stopped; and they are accordingly rendered fixed and stationary relative to the sleeve 20. As in the first embodiment, the rotating external screw 10, in attempting to force the balls 18 to revolve, drives the internal screw housing 14 to the right in response to the component of force acting in a corresponding direction as a consequence of the combined effect of the direction of rotation of the external screw and the left-inclined threads thereof.

When the desired translation has been completed, the electromagnetic coil 28 is deenergized, collapsing its magnetic filed. The balls 18 are accordingly released from their fixed and stationary state and are permitted once again to revolve around the interior surface of the sleeve 20 and to thereby cause the interior screw housing 14 to idle in a fixed position.

Although, for the purpose of explanation, the method for translating the internal screw housing 14 to the right was detailed, it should be evident that the procedure would suffice equally for translating it to the left, were the external screw 10 merely rotated in the opposite direction, that is, in a clockwise direction as viewed from the left end thereof. Indeed, reversing the direction of rotation of the external screw 10 would serve as a perfectly adequate method for returning the internal screw housing 14 to a rest or home position after its desired translation has been completed. Another functional means for returning the internal screw housing 14 to a home position would be the provision of a resilient member (not shown) operatively connected between the housing and the supporting means and displaceable by the housing translations such that, when the drivescrew device is not actuated and not held at an advanced position, the resilient member would force the housing back along the external screw 10, the balls 18 being at this time free both to individually rotate and to revolve within the housing.

While the actuatable drivescrew device has been shown and described in considerable detail, it should be understood that many changes and variations may be made therein without departing from the spirit and scope of the invention.

I claim:

1. An actuatable drivescrew device comprising:
   a rotatable external screw having helical threads;
   an actuatable internal screw formed of a plurality of individually rotatable balls and effectively engageable with said external screw;
   an internal screw housing for effectively enclosing said balls around said screw, said housing having an internally smooth, cylindrical sleeve for maintaining said balls in a helically adjacent relationship defined by the threads of said external screw and also having an annular abutment disposed at each end of said sleeve for preventing said balls from escaping their helically ordered confine within said sleeve, said internal screw normally being free to rotate with said external screw within said housing; and
   an internal screw-actuating member for selectively actuating said internal screw, said actuating member being a stop selectively positionable in the path of revolution of at least one of said balls, thereby preventing said internal screw from rotating with said external screw within said housing, said balls collectively forming internal threads fixed with respect to said housing and effectively engaging the threads of said external screw such that rotation of said latter screw produces longitudinal translation of said housing relative thereto.

2. The actuatable drivescrew device defined by claim 1 wherein said stop is insertable through said sleeve.

3. The actuatable drivescrew device defined by claim 1 wherein said stop is resiliently biased out of the paths of revolution of said balls.

4. The actuatable drivescrew device defined by claim 1 wherein said external screw is a helically threaded shaft.

5. A method for selectively transposing rotary to linear motion comprising the steps of: inserting a rotatable, external screw longitudinally through an internally smooth, sleeve-type housing containing a plurality of individually rotatable balls therein such that said balls are disposed in a helically adjacent relationship along those threads of said external screw that are within said housing; rotating said external screw within said housing, said balls normally being revolvable with said external screw along the smooth, internal surface of said housing; and inserting a selectively insertable stop into the path of revolution of at least one of said balls, thereby preventing all of said balls from revolving with said external screw, said balls forming internal threads stationary with respect to said housing and effectively engaging the threads of said external screw such that rotation of said latter screw produces longitudinal translation of said housing relative thereto.

* * * * *